US008776987B2

(12) United States Patent
Neuber

(10) Patent No.: US 8,776,987 B2
(45) Date of Patent: Jul. 15, 2014

(54) SPRING COUPLED CABLE RUN

(75) Inventor: Wolfgang Neuber, Pressath (DE)

(73) Assignee: Siemens Aktiengesellschaft, München (DE)

( * ) Notice: Subject to any disclaimer, the term of this patent is extended or adjusted under 35 U.S.C. 154(b) by 271 days.

(21) Appl. No.: 12/700,462

(22) Filed: Feb. 4, 2010

(65) Prior Publication Data
US 2010/0200289 A1    Aug. 12, 2010

(30) Foreign Application Priority Data
Feb. 12, 2009    (DE) .................. 10 2009 008 625

(51) Int. Cl.
*B65G 29/00* (2006.01)
*B65G 43/08* (2006.01)
*B65G 47/34* (2006.01)
*B65G 47/84* (2006.01)

(52) U.S. Cl.
USPC ............ 198/465.4; 198/678.1; 198/680; 198/683; 198/684; 198/686; 198/352

(58) Field of Classification Search
USPC ............ 248/610, 330.1, 329, 328, 73, 58, 59, 248/60, 61, 63, 343, 323, 334.1, 75; 174/40 R, 41, 72 A; 198/465.4, 678.1, 198/680, 683, 684, 686, 352
See application file for complete search history.

(56) References Cited

U.S. PATENT DOCUMENTS

| 1,320,740 | A | * | 11/1919 | Coghlin | 104/91 |
| 1,686,678 | A | | 10/1928 | Burke | |
| 2,251,739 | A | * | 8/1941 | Huntsinger | 359/367 |
| 3,544,702 | A | * | 12/1970 | Bueckner et al. | 174/42 |
| 3,557,935 | A | * | 1/1971 | Gerisch | 198/352 |
| 3,650,545 | A | * | 3/1972 | Freed | 280/421 |
| 3,982,623 | A | * | 9/1976 | DePas et al. | 198/367 |
| 4,093,047 | A | | 6/1978 | Wampfler | |
| 4,344,363 | A | * | 8/1982 | Veith | 104/162 |
| 4,354,594 | A | * | 10/1982 | Galloway | 198/743 |
| 4,846,320 | A | * | 7/1989 | Clarke | 191/12 R |
| 4,961,683 | A | * | 10/1990 | van Huet | 414/783 |
| 5,123,131 | A | * | 6/1992 | Jandrakovic | 5/85.1 |
| 5,143,201 | A | * | 9/1992 | Speckhart et al. | 198/502.3 |

(Continued)

FOREIGN PATENT DOCUMENTS

| DE | 2628112 A1 | 1/1978 |
| DE | 8703229 U1 | 12/1987 |
| DE | 4415899 A1 | 11/1995 |

OTHER PUBLICATIONS

German Office Action dated Aug. 13, 2009 with English translation.
Chinese Office Action dated Nov. 25, 2011 for corresponding Chinese Patent Application No. 201010117604.6 with English translation.

*Primary Examiner* — Terrell McKinnon
*Assistant Examiner* — Michael McDuffie
(74) *Attorney, Agent, or Firm* — Lempia Summerfield Katz LLC

(57) ABSTRACT

A ceiling-mounted apparatus for running a cable harness, in more precise terms a ceiling-mounted apparatus for running a cable harness with a chain of guide carriages coupled to one another by means of spring elements, said guide carriages running in at least one guide rail in each instance, with a first guide carriage being connected to a cable harness source by means of at least one spring element and with the guide carriages comprising additional spring elements for attaching the cable harness.

8 Claims, 3 Drawing Sheets

(56) References Cited

U.S. PATENT DOCUMENTS

| | | | |
|---|---|---|---|
| 5,323,989 A * | 6/1994 | Hamada et al. | 248/60 |
| 6,199,682 B1 * | 3/2001 | Matkovich | 198/465.4 |
| 6,425,417 B1 * | 7/2002 | Paschke | 138/107 |
| 6,609,692 B1 * | 8/2003 | Muresan et al. | 248/343 |
| 7,628,238 B2 * | 12/2009 | Kobayashi et al. | 180/89.2 |
| 2007/0169660 A1 * | 7/2007 | Pabst | 104/196 |
| 2010/0219300 A1 * | 9/2010 | Gilbert | 248/63 |

* cited by examiner

SPRING COUPLED CABLE RUN

The present patent document claims the benefit of DE 10 2009 008 625.0, filed Feb. 12, 2009, which is hereby incorporated by reference.

BACKGROUND

The present embodiments relate to a ceiling-mounted apparatus for guiding a cable harness.

Robots with a large range of movement require flexible cable runs, which guarantee the guidance of the cable harness throughout the entire movement range of the moveable parts of the robot. The cable harness couples the moveable parts to the corresponding controller. The cable runs limit the mechanical stress on the cable harness to defined maximum values and ensure that the cable harness is always within a defined corridor in order to be able to reliably rule out collisions between moveable parts and the cable harness and other dangers originating from the cable harness.

SUMMARY AND DESCRIPTION

The present embodiments may obviate one or more of the drawbacks or limitations inherent in the related art. For example, in one embodiment, a flexible cable run may be provided.

In one embodiment, a ceiling-mounted apparatus is provided. The ceiling-mounted apparatus guides a cable harness with a chain of guide carriages coupled to one another by spring elements. The guide carriages run in at least one guide rail, with a first guide carriage being connected to a cable harness source by at least one spring element. The guide carriage includes spring elements for attaching the cable harness.

The apparatus may be configured such that the spring elements coupling the guide carriage alone define the distances of the carriages from one another in the unloaded state. For example, additional spacers may not be required.

The spring elements may attach the cable harness alone to define the position of the cable harness in the unloaded state. For example, additional spacers between the guide carriages and the cable harness may not be required.

At least some of the spring elements provided to attach the cable harness can be embodied as balancer elements, such as elements by which the cable harness is moved into an almost "weightless" state over the entire cable length and which revert back to a defined bearing load after release.

Provision can finally be made for the spring elements to become softer with increasing distance of the supporting guide carriages from the cable harness origin.

DETAILED DESCRIPTION

Figure 1A:
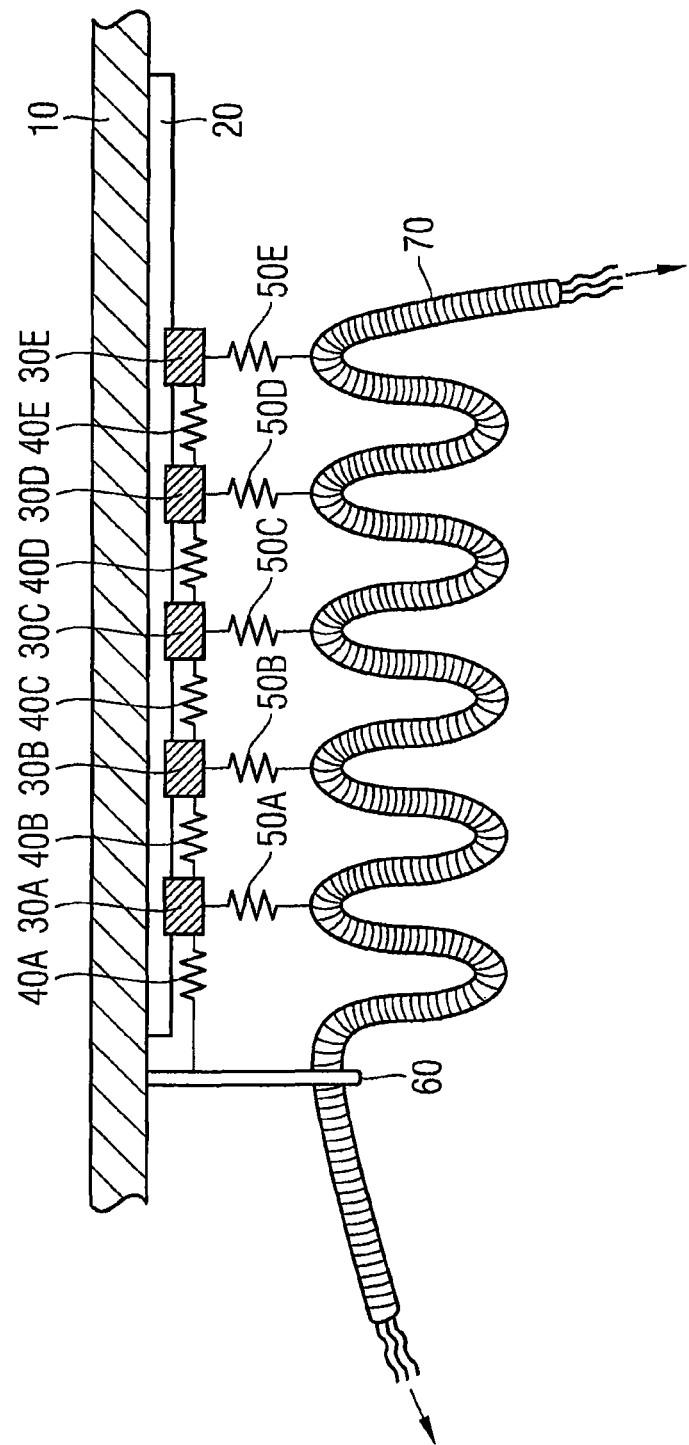
FIG. 1A shows one embodiment of a tension-free cable harness.
Figure 1B:
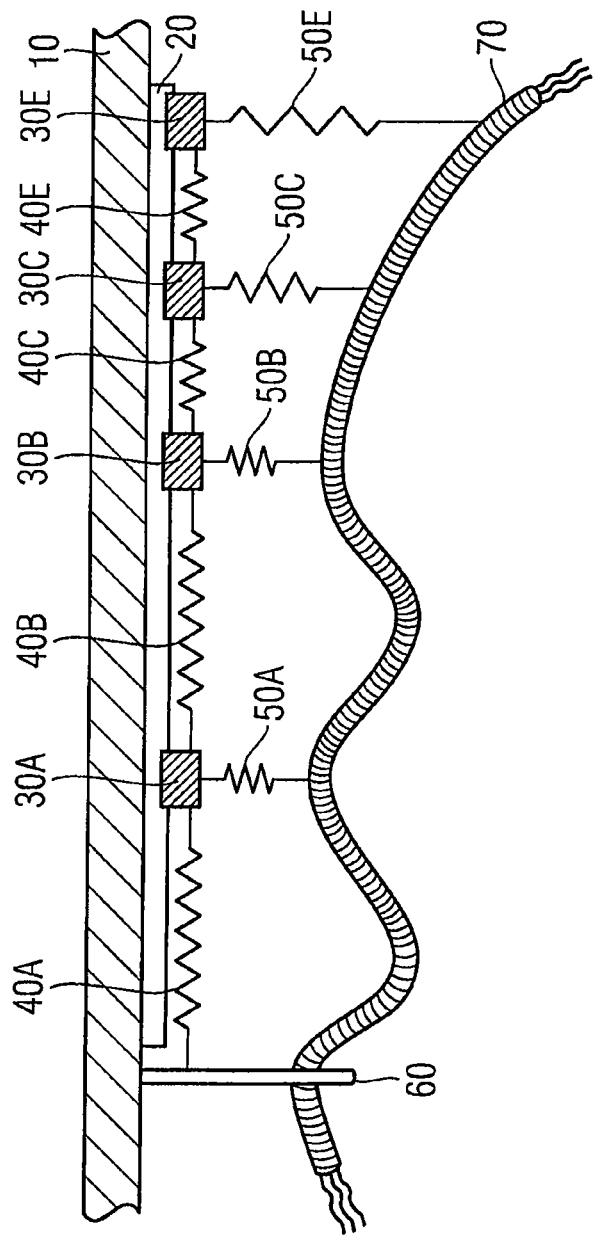
FIG. 1B shows one embodiment of a cable harness subjected to tensile stress.
Figure 2:
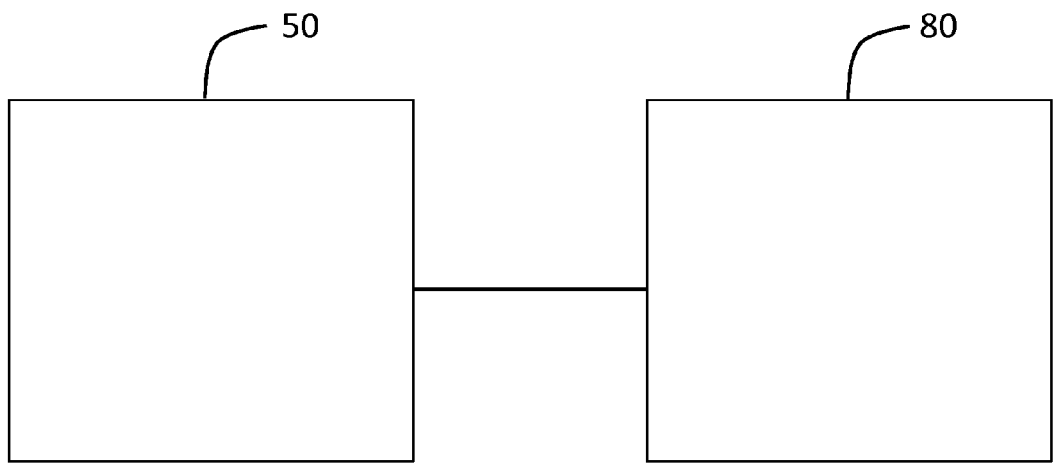
FIG. 2 shows one embodiment of a spring element including a balancer element.

FIG. 1 shows a guide rail 20 mounted on a ceiling 10. The ceiling 10 supports five guide carriages 30A-E. The rail 20 can be bent straight or in any fashion. Several rails can also be provided. Carriages can run in all rails for load distribution purposes. Alternatively, provision may be made for a first carriage group to run in a first rail, a second carriage group to run in a second rail and/or to be able selectively to restrict the movement spaces of the individual carriage groups.

A first guide carriage 30A is coupled to a cable source 60 by a first spring element 40A. The cable source 60 forms a stress relief in the direction of the non-moveable parts of a robot and may be a separating wall or the housing of a controller, for example.

The first guide carriage 30A may be coupled to the next guide carriage 30B by a second spring element 40B. The next guide carriage 30B can be connected in turn with a spring element 40C with the next guide carriage but one guide carriage 30C so that the guide carriages form a chain.

Each guide carriage 30 may include a spring element 50A-E used to attach the cable harness 70.

A cable harness length may be highly variable. The apparatus may be flexibly adjusted to the respective local conditions during installation: apparatuses may be created which are optimally adjusted depending on the number of guide carriages, number and shape of the guide rails and on the basis of the spring forces.

The present embodiments may relate to robots within the field of medicine. The cable harness 70 may be routed on the ceiling of the treatment room and at the same time no loose dangling of the cable harness may be allowed to occur across the whole movement range. The selected attachment to rail-guided guide carriages 30 ensures that the cable harness is always within a defined corridor. The size of this corridor can be influenced by the number of guide carriages 30 and the rigidity of the spring elements 40 and 50.

The present embodiments may achieve a linear buffering and/or storage of the necessary cable harness lengths on the ceiling of the corresponding room. The buffering and the "tension" of the cable harness are realized at the same time in a system, for example, no additional devices are needed for cable harness retraction.

In one embodiment, the term "rail" is understood to mean a linear guide system, for example, a system which permits a linear movement of several carriages which can be moved independently of one another. Standard linear guides based on roller or sliding bearing system are conceivable.

The spring elements 40 and 50 can be any spring elements. The respective spring stiffnesses of the spring elements 40 and 50 employed influence the function of the device. It may be meaningful to use softer elements within the area of cable output to the moveable parts of the robot than in the area of the stress relief 60.

It is also possible to design at least one part of the spring element 50 used to attach the cable harness 70 as a balancer element 80.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A ceiling-mounted apparatus for running a cable harness, the apparatus comprising: at least one guide rail; and a plurality of guide carriages coupled to one another by spring elements, the plurality of guide carriages being configured to run in the at least one guide rail, wherein a first guide carriage of the plurality of guide carriages is connected to a cable harness source by at least one spring element, wherein the plurality of guide carriages includes additional spring elements, each guide carriage of the plurality of guide carriages supporting the cable harness via a corresponding one of the additional spring elements, the cable harness hangs below the guide carriage, and wherein a first of the spring elements is disposed between and directly connected to the first guide carriage and a second guide carriage of the plurality of guide carriages, the second guide carriage being adjacent to the first guide carriage, a second of the spring elements being disposed between and directly connected to the second guide carriage and a third guide carriage of the plurality of guide carriages, the third guide carriage being adjacent to the second guide carriage.

2. The apparatus as claimed in claim 1, wherein the spring elements coupling the plurality of guide carriages define distances of the plurality of guide carriages from one another in an unloaded state.

3. The apparatus as claimed in claim 1, wherein the additional spring elements for attaching the cable harness define a position of the cable harness in an unloaded state.

4. The apparatus as claimed in claim 1, further comprising balancer elements at one or more of the additional spring elements for attaching the cable harness.

5. The apparatus as claimed in claim 1, wherein the spring elements and the additional spring elements are softer with an increased distance of the plurality of guide carriages from the cable harness source.

6. The apparatus as claimed in claim 2, wherein the additional spring elements for attaching the cable harness define a position of the cable harness in an unloaded state.

7. The apparatus as claimed in claim 6, further comprising balancer elements at one or more of the additional spring elements for attaching the cable harness.

8. The apparatus as claimed in claim 7, wherein the spring elements and the additional spring elements are softer with an increased distance of the plurality of guide carriages from the cable harness source.

\* \* \* \* \*